United States Patent
Sudesh et al.

(10) Patent No.: US 7,668,211 B1
(45) Date of Patent: Feb. 23, 2010

(54) WAVEGUIDE-PUMPING GAIN GUIDED INDEX ANTIGUIDED FIBER LASER

(75) Inventors: Vikas Sudesh, Oviedo, FL (US); Timothy McComb, Orlando, FL (US); Martin Richardson, Geneva, FL (US); William Hagemann, Orlando, FL (US); Michael Bass, Indian River Shores, FL (US); John Ballato, Clemson, SC (US); Anthony Siegman, Stanford, CA (US)

(73) Assignees: University of Central Florida, Research Foundation, Inc., Orlando, FL (US); Clomson University, Clomson, SC (US)

( * ) Notice: Subject to any disclaimer, the term of this patent is extended or adjusted under 35 U.S.C. 154(b) by 5 days.

(21) Appl. No.: 11/937,771

(22) Filed: Nov. 9, 2007

(51) Int. Cl.
*H01S 3/30* (2006.01)

(52) U.S. Cl. .............................. 372/6; 372/71; 372/75; 372/70

(58) Field of Classification Search .................. 372/6, 372/71, 75, 70
See application file for complete search history.

(56) References Cited

U.S. PATENT DOCUMENTS

| 5,712,941 | A * | 1/1998 | Imoto et al. ................. 385/126 |
| 6,751,388 | B2 * | 6/2004 | Siegman ...................... 385/124 |
| 2003/0031442 | A1 * | 2/2003 | Siegman ...................... 385/124 |

OTHER PUBLICATIONS

Y. Chen, et al., "Experimental demonstration of gain guided lasing in an index antiguiding fiber" Advanced Solid State Photonics Conference, Vancouver, British Columbia, Jan. 2007.
A.E. Siegman, et al., "Confined propagation and near single-mode laser oscillation in a gain-guided index antiguided optical fiber" Appl. Phys. Lett., vol. 89, pp. 1-3, Proof Copy 274650APL (2006).
A.E. Siegman, "Propagating modes in gain-guided optical fibers" Opt. Soc. Am. A, vol. 20, No. 8, pp. 1617-1628 (2003).
L. Goldberg, et al., :V-groove side-pumped 1.5um fibre amplifier Electron Lett., vol. 33, No. 25, pp. 2127-2129 (1997).
P. Polynkin, et al., "Efficient and scalable side pumping scheme for short high-power optical fiber lasers and amplifiers" IEEE Photonics Tech. Lett., vol. 16, No. 9, pp. 2024-2026 (2004).
J. Ballato, et al., "Optical properties of perfluorocyclobutyl polymers" J. Opt. Soc. Am. B, vol. 20, No. 9, pp. 1838-1843 (2003).

* cited by examiner

*Primary Examiner*—Minsun Harvey
*Assistant Examiner*—Kinam Park
(74) *Attorney, Agent, or Firm*—Brian S. Steinberger; Phyllis K. Wood; Law Offices of Brian S. Steinberger, P.A.

(57) ABSTRACT

Methods, systems and devices for a waveguide pumping gain guided index antiguided fiber laser having a fiber selected for a refractive index crossover at a wavelength between a pump wavelength and a laser emission wavelength. A waveguide pumping system pumps a light having a pump wavelength into the fiber allowing a laser light to be captured by a gain guided process in the core while the pump light, propagating in the cladding is coupled to the core. The fiber selection includes selecting a fiber with a cladding material having a refractive index less than a core material refractive index for a pump wavelength and a core refractive index at the laser emission wavelength is less than the cladding refractive index at the same laser emission wavelength to allow the pump light to propagate through the cladding as a conventional wave guided fiber laser, white the laser emission is captured within the core as an index antiguided, gain guided wave.

21 Claims, 11 Drawing Sheets

FIG. 4a (PART 1) — JOIN TO PART 2 →

| INPUT PARAMETERS | | LOSSLESS ASSUMPTION | |
|---|---|---|---|
| | | OC REFLECTIVITY | THRESHOLD GAIN (cm^-1) |
| FIBER CORE RADIUS (cm) | 1.00E-02 | 0.99 | 0.0025 |
| WAVELENGTH (cm) | 0.0001053 | 0.98 | 0.0051 |
| MIRROR 1 REFLECTIVITY | 1 | 0.97 | 0.0076 |
| CORE INDEX | 1.5689 | 0.96 | 0.0102 |
| INDEX STEP | 0.0045 | 0.95 | 0.0128 |
| FIBER LENGTH (cm) | 2 | 0.94 | 0.0155 |
| CAVITY LOSS (cm^-1) | 0.015 | 0.93 | 0.0181 |
| | | 0.92 | 0.0208 |
| CALCULATED PARAMETERS | | 0.91 | 0.0236 |
| CALCULATED CAVITY LOSS (%) | 3.0 | 0.90 | 0.0263 |
| FRESNEL NUMBER | 0.4748 | 0.89 | 0.0291 |
| | | 0.88 | 0.0320 |
| | | 0.87 | 0.0348 |
| | | 0.86 | 0.0377 |
| | | 0.85 | 0.0406 |
| | | 0.84 | 0.0436 |
| | | 0.83 | 0.0466 |
| | | 0.82 | 0.0406 |
| | | 0.81 | 0.0527 |
| | | 0.80 | 0.0558 |
| | | 0.79 | 0.0589 |
| | | 0.78 | 0.0621 |
| | | 0.77 | 0.0553 |
| | | 0.76 | 0.0686 |
| | | 0.75 | 0.0719 |
| | | 0.74 | 0.0753 |
| | | 0.73 | 0.0787 |
| | | 0.72 | 0.0821 |
| | | 0.71 | 0.0856 |

| KEY | |
|---|---|
| No CC | LASER THRESHOLD LOW ENOUGH THAT LASING IS REACHED BEFORE GAIN GUIDING CAN TURN ON |
| GG | SINGLE MODE GAIN GUIDING CAN OCCUR BECAUSE LP01 THRESHOLD IS EXCEEDED BUT LP11 IS NOT |
| MMGG | LASER THRESHOLD IS HIGH ENOUGH THAT MULTIMODE GAIN GUIDING CAN OCCUR |

FIG. 4b (PART 2)

| LOSSLESS ASSUMPTION (CONT') | | | LOSS TAKEN INTO ACCOUNT | |
|---|---|---|---|---|
| LP01 GG THRESHOLD GAIN (cm^-1) | LP11 GG THRESHOLD GAIN (cm^-1) | CAN GG HAPPEN? NO LOSS CASE | OC REFLECTIVITY | THRESHOLD INCLUDING CAVITY LOSS (cm^-1) |
| 0.0174 | 0.0442 | No GG | 0.99 | 0.0175 |
| 0.0174 | 0.0442 | No GG | 0.98 | 0.0201 |
| 0.0174 | 0.0442 | No GG | 0.97 | 0.0226 |
| 0.0174 | 0.0442 | No GG | 0.96 | 0.0252 |
| 0.0174 | 0.0442 | No GG | 0.95 | 0.0278 |
| 0.0174 | 0.0442 | No GG | 0.94 | 0.0305 |
| 0.0174 | 0.0442 | GG | 0.93 | 0.0331 |
| 0.0174 | 0.0442 | GG | 0.92 | 0.0358 |
| 0.0174 | 0.0442 | GG | 0.91 | 0.0386 |
| 0.0174 | 0.0442 | GG | 0.90 | 0.0413 |
| 0.0174 | 0.0442 | MMGG | 0.89 | 0.0441 |
| 0.0174 | 0.0442 | MMGG | 0.88 | 0.0470 |
| 0.0174 | 0.0442 | MMGG | 0.87 | 0.0498 |
| 0.0174 | 0.0442 | MMGG | 0.86 | 0.0527 |
| 0.0174 | 0.0442 | MMGG | 0.85 | 0.0556 |
| 0.0174 | 0.0442 | MMGG | 0.84 | 0.0586 |
| 0.0174 | 0.0442 | MMGG | 0.83 | 0.0616 |
| 0.0174 | 0.0442 | MMGG | 0.82 | 0.0646 |
| 0.0174 | 0.0442 | MMGG | 0.81 | 0.0677 |
| 0.0174 | 0.0442 | MMGG | 0.80 | 0.0708 |
| 0.0174 | 0.0442 | MMGG | 0.79 | 0.0739 |
| 0.0174 | 0.0442 | MMGG | 0.78 | 0.0771 |
| 0.0174 | 0.0442 | MMGG | 0.77 | 0.0803 |
| 0.0174 | 0.0442 | MMGG | 0.76 | 0.0836 |
| 0.0174 | 0.0442 | MMGG | 0.75 | 0.0869 |
| 0.0174 | 0.0442 | MMGG | 0.74 | 0.0903 |
| 0.0174 | 0.0442 | MMGG | 0.73 | 0.0937 |
| 0.0174 | 0.0442 | MMGG | 0.72 | 0.0971 |
| 0.0174 | 0.0442 | MMGG | 0.71 | 0.1006 |

FIG. 4c (PART 3)

LOSS TAKEN INTO ACCOUNT (CONT)

| LP01 GG THRESHOLD GAIN (cm^-1) | LP11 GG THRESHOLD GAIN (cm^-1) | CAN GG HAPPEN? LOSS CASE |
|---|---|---|
| 0.0174 | 0.0442 | GG |
| 0.0174 | 0.0442 | GG |
| 0.0174 | 0.0442 | GG |
| 0.0174 | 0.0442 | GG |
| 0.0174 | 0.0442 | GG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |
| 0.0174 | 0.0442 | MMGG |

JOIN TO PART 2 ↓

WAVEGUIDE-PUMPING GAIN GUIDED INDEX ANTIGUIDED FIBER LASER

FIELD OF THE INVENTION

This invention relates to fiber lasers and, in particular, to methods, systems and apparatus for a gain guided index antiguided fiber laser designed to function as conventional index guiding fiber for pump wavelength and like a gain guided index antiguided fiber for signal wavelengths.

BACKGROUND AND PRIOR ART

Originally proposed by Siegman in his 2003 paper, the concept of gain guiding comes about from the analysis of the V parameter of an optical fiber when the imaginary component of the refractive index is taken into account. The V parameter is the controlling factor in the mode propagation of standard index guiding fibers. Using the V parameter in numerical mode solvers the mode characteristics of an optical fiber or waveguide can be determined. Usually the V parameter is a real number that only takes into account real refractive index. The imaginary component comes about as a result of either loss or gain in the medium that light is propagating through. The V parameter of a waveguide is given by the following equation:

$$V = \frac{2\pi a}{\lambda}\sqrt{(n_0 + \Delta n)^2 - n_0^2} \quad (1)$$

where a is the radius of a fiber-core or half width of a slab waveguide, $n_0$ is the cladding index and $\Delta n$ is the index step between the core and clad. A plane wave propagating in a medium with some gain or loss $\Delta\alpha$ will propagate according to $$e^{-j\left(\frac{2\pi z}{\lambda}(n_0+\Delta n)\right)+\Delta\alpha z}$$

the propagation constant in this expression is rewritten as $$\frac{2\pi(n_0 + \Delta n)}{\lambda} + j\Delta\alpha = \frac{2\pi(n_0 + \Delta n + j(\lambda/2\pi)\Delta\alpha)}{\lambda} = \frac{2\pi(n_0 + \Delta\tilde{n})}{\lambda} \quad (2)$$

where $\tilde{n}$ is the complex refractive index step which encompasses both index and gain/loss. With this knowledge, the V parameter is rewritten as the complex V-squared parameter to take into account this gain factor.

$$\tilde{V}^2 = \left(\frac{2\pi a}{\lambda}\right)^2[(n_0 + \Delta\tilde{n})^2 - n_0^2] \cong \left(\frac{2\pi a}{\lambda}\right)^2 2n_0\left(\Delta n + j\frac{\lambda}{2\pi}\Delta\alpha\right) \quad (3)$$

The approximation holds for small index steps and gain. Using numerical mode solving techniques for optical fibers one can use the V-squared parameter to determine the propagation characteristics of modes in an optical fiber which has both gain and index traits. Siegman plots (U.S. Pat. No. 6,751, 388) an example of such calculations for the first two modes of a fiber. FIG. 1 is a plot showing the mode boundaries and mode propagation regions for the $LP_{01}$ and $LP_{11}$ modes of a cylindrical gain-guiding step-profile in the complex $\Delta n$, $\Delta\alpha$ plane.

As shown in FIG. 1, the propagation of a mode depends upon the value of the index and gain steps. Pure gain guiding can occur in a medium with no index step if the gain term $\Delta\alpha$ is large enough to support the LP01 mode shown above the first solid line. A combination of negative or positive index difference between core and cladding and a gain or loss step also allows modes to be supported. The $\Delta\alpha$ axis gives the imaginary part of the V-squared parameter, which can be calculated from the imaginary component of the previous equation. The benefit of gain guiding is that because $\Delta\alpha$ is fairly small, relatively large cores, which are represented by $\alpha$ in the equation (3), is used and single mode oscillation is maintained. In standard index guided fibers the V parameter is fixed, because it is a function of the refractive index and the core size. In gain guided fibers the gain can be changed to compensate for larger cores regardless of the type of glass material used.

Deficiencies of prior art include the fact that gain guided index antiguided fibers are difficult to pump efficiently, despite a large promise of emitting a single transverse laser mode from a very large core and conventional index guiding large mode area fibers are limited to core sizes of around 25 microns for single mode operation, resulting in a limitation on the possible power produced in the fibers due to high power densities. Even these complex designs have only been proven to be single mode for sizes of <100 micron core sizes. High power non-fiber based lasers like CO2, solid state crystal or thin disk have difficulty reaching high powers and high beam qualities and other large mode area concepts and designs are far more complex and hence expensive to manufacture including Photonic Crystal Fibers or Chirally Coupled Core fibers etc. Currently work on such complex designs has been limited to silica fiber, which may be disadvantageous for some rare earth ions, like Thulium, which require high doping percentages to work efficiently.

Therefore there is a need of finding a solution of the pumping problem in gain guided index antiguided fiber lasers for practical use as a laser gain medium with the gain guided index antiguided fiber designed-to act like a conventional fiber (index guiding) for pump wavelength, and like a gain guided index antiguided fiber (index antiguiding) for signal wavelengths.

SUMMARY OF THE INVENTION

A primary objective of the invention is to provide methods, systems and devices for a an index crossover gain guided index antiguided fiber laser to be pumped longitudinally and sideways efficiently, similar to conventional fibers, yet maintaining the gain guiding and index antiguiding properties at signal wavelength.

A secondary objective of the invention is to provide methods, systems and devices for an index crossover gain guided index antiguided fiber laser made of fibers as long as it is necessary in length. Longer length reduces thermal issues, while smaller on can be compact and with much lower non-linearity.

A third objective of the invention is to provide methods, systems and devices for an index crossover gain guided index antiguided fiber laser having a very large mode area with single transverse laser mode to allow very high powers to be generated in a single mode without causing damage to fiber end facet.

A fourth objective of the invention is to provide methods, systems and devices for an index crossover gain guided index antiguided fiber laser having an all fiber design makes cooling simpler and more efficient.

A fifth objective of the invention is to provide methods, systems and devices for an index crossover gain guided index antiguided fiber laser with a simple to manufacture fiber design will lead to inexpensive fibers.

A first preferred embodiment of the invention provides a waveguide pumping gain guided index antiguided fiber laser including a gain guided index antiguiding fiber having a refractive index crossover at a wavelength between a pump wavelength and a laser emission wavelength, the fiber having a core and a cladding and a waveguide pumping system to produce a pump light having a pump wavelength, the pump light pumped into the refractive index crossover gain guided-index antiguided fiber, wherein the refractive indices of the core and cladding of a gain guided index antiguiding fiber are selected so the laser light is captured by the gain guided process in the core and the pump light propagating in the cladding is effectively coupled to the core.

Alternative pumping systems can be used including end-pumped into one end of the using fiber based coupling with an output coupler spliced with an opposite end of the fiber; end-pumped into one end of the fiber using fiber based coupling and having an output coupler butt coupled with an opposite end of the fiber; a tapered fiber bundle for uniform pump light distribution along a length of the fiber for uniform thermal distribution; a v-groove side pumping system, the fiber v-grooves directly on a fiber side wall as where pump light is injected through the cladding and coupled into a first cladding after undergoing a total internal reflection at a glass-air interface of the v-groove facet; or a mechanical structure to hold and align a laser diode array and the fiber for side pumping the fiber and having a cooling system coupled with the mechanical structure for cooling the laser diode array and the fiber.

A second embodiment provides a method for producing a waveguide pumping gain guided index antiguided fiber laser comprising the steps of selecting a gain guided index antiguiding fiber having a refractive index crossover at a wavelength between a pump wavelength and a laser emission wavelength, providing a waveguide pumping system to produce a pump light at a pump wavelength and pumping the pump light into the gain guided index antiguiding fiber, the refractive indices of a core and a cladding of the gain guided index antiguiding fiber are selected to allow a laser light to be captured by a gain guided process in the core while the pump light propagating in the cladding is effectively coupled to the core. The gain guided index antiguided fiber selection step includes selecting a fiber material including a cladding material and a core material, the cladding material having a cladding refractive index less than a core refractive index for a wavelength of optical pumping radiation from the waveguide pumping system and further selecting the fiber material for a laser emission wavelength, the core refractive index of the core material at the laser emission wavelength is less than the cladding refractive index at the same laser emission wavelength to allow the pump light to propagate through the cladding as a conventional wave guided fiber laser, while the laser emission is captured within the core as an index antiguided, gain guided wave.

Further objects and advantages of this invention will be apparent from the following detailed description of preferred embodiments which are illustrated schematically in the accompanying drawings.

BRIEF DESCRIPTION OF THE FIGURES

FIGS. 4a, 4b, and 4c show an example of an Excel sheet with the parameters of the first diode end pumped gain guided laser.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
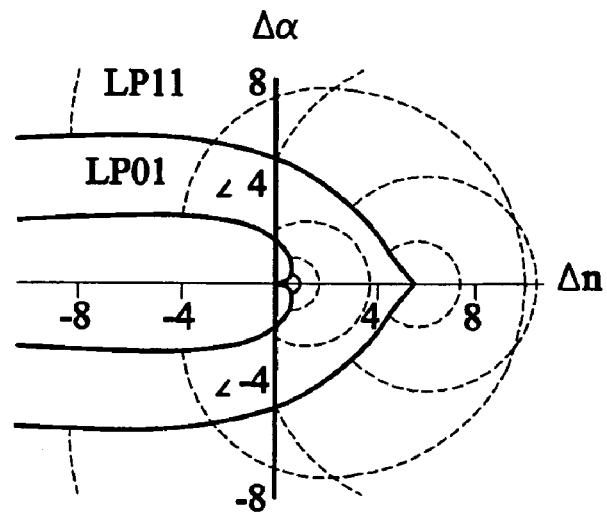
FIG. 1 is a plot showing the mode boundaries and mode propagation regions for the $LP_{01}$ and $LP_{11}$ modes of a cylindrical gain-guiding step-profile in the complex $\Delta n$, $\Delta \alpha$ plane.
Figure 2:
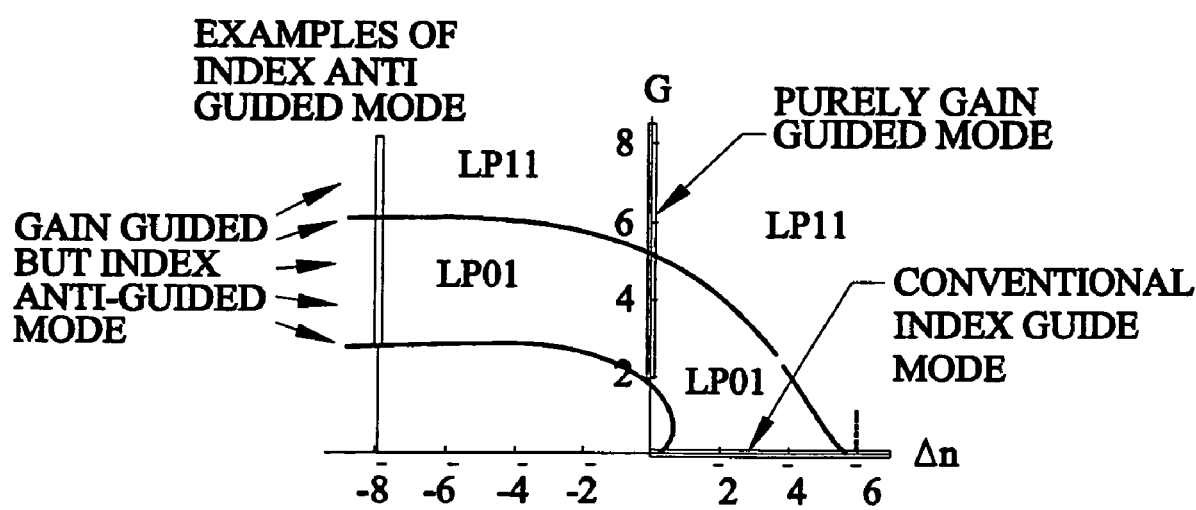
FIG. 2 is a plot showing the propagation regions for $LP_{01}$ and $LP_{11}$ modes of an optical fiber in the complex $\alpha n$, $\Delta \alpha$ plane.

It would be useful to discuss the meanings of some terminology used herein and their applications starting with a description of index antiguiding. Originally it was thought that only pure gain guiding was plausible, which means that a near zero index step must be created and maintained if the fiber is to gain guide in single mode only which is not an easy feat to produce in the real world. Recently however, it has come to light that strong index antiguiding would work in a laser cavity as disclosed in U.S. Pat. No. 6,751,388 issued to Siegman on Jun. 15, 2004. This means that a fiber could be produced with the opposite index step as would normally be used, essentially not allowing light to propagate in the core. The plot in FIG. 2 shows that single modes can also exist in the index antiguiding regime.

Figure 3:
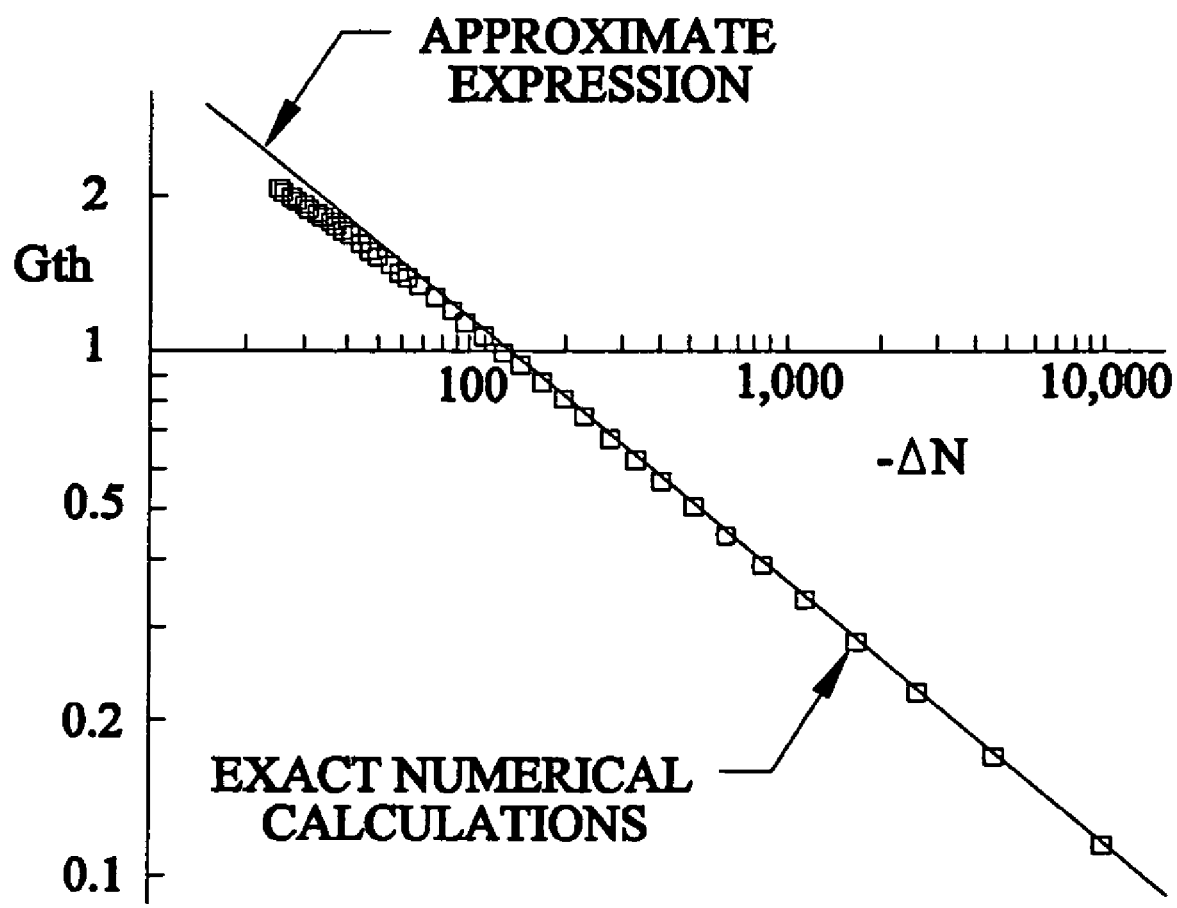
FIG. 3 is a graph showing threshold values of the normalized gain parameter G for the LP01 mode in a gain guided index antiguided fiber plotted verses negative values of the index step parameter $\Delta N$.

Further into the negative index guiding regime the threshold gain required is significantly decreased. This is a significant benefit because in pure gain guided fibers it is difficult to dope a fiber with enough ions and be able to pump it hard enough to create the gain guiding effect. Implementing the novel index antiguiding regime according to the present invention significantly lowers the requirement for the minimum gain, and hence makes gain guiding a feasible technique. FIG. 3 is a graph showing threshold values of the normalized gain parameter G for the $LP_{01}$ mode in a gain guided index antiguided (GG IAG) fiber plotted verses negative values of the index step parameter $\Delta N$. As shown in FIG. 3, as the real part of V-square $-\Delta N$ is increased, the required imaginary V-squared parameter G decreases, meaning far less gain is required to achieve gain guiding. As a result, the index antiguiding concept allows fibers to be fabricated with reasonable doping levels that can be pumped with reasonable pump powers.

For purpose of example, and not limitation, a flash-lamp pumped gain guided index antiguided fiber laser was demonstrated with a single mode ($M^2$ at approximately 1.5) laser action in a 10% trivalent Neodymium ($Nd^{3+}$) doped and 1% $Nd^{3+}$ doped, phosphate glass fiber with varying core diameter from 100 µm to 400 µm. The fiber has a strong index antiguiding with a $-\Delta N$ greater than approximately 1256. The 10% $Nd^{3+}$ fiber had 250 µm cladding with a 100 µm core, whereas 1% $Nd^{3+}$ doped fiber had core diameter varying from 100 µm to 400 µm in 100 µm steps. In the example with 1% $Nd^{3+}$ doped fiber the cladding was approximately 1.67 times the core diameter, the length of the fiber was approximately 13 cm and only approximately 8.5 cm was pumped by the lamp. The length of fiber was placed inside a capillary tube and this tube was placed inside a flash-lamp chamber. The laser was pumped with up to approximately 90 J of light from the flash lamp, with a coupling efficiency of less than approximately $3 \times 10^{-4}$. The lamp operated at 1 Hz with a pulse duration of approximately 350 microseconds and an HR at approximately 1050 nm mirror was used as one end of the laser cavity. The other end of the fiber included either an approximately 4% Fresnel reflection or output couplers with varying reflectivity predicted by the model.

Progress in gain guided fiber lasers has lead to the development of a simple model for determining the proper output coupler of the laser. Without the proper choice of output coupling, gain guiding can not be obtained because of the nature of the gain guiding modes. In Siegman's analysis the modes in a gain guided fiber have a threshold behavior based upon the gain achieved in the fiber and on the fiber parameters themselves. These two parameters are $\Delta N$ and G, the real ($\Delta N$) and imaginary (G) parts of the V-Squared parameter for a fiber. These two terms are given by:

$$\Delta N = 2n_0 \Delta n \cdot \left(\frac{2\pi a}{\lambda}\right)^2 \quad (4)$$

$$G = \frac{n_0 \lambda}{2\pi} \cdot \left(\frac{2\pi a}{\lambda}\right)^2 \cdot g \quad (5)$$

where $\Delta n$ is the index step in the fiber, negative for anti index fibers used here, $n_0$ is the fiber index, a is the fiber core radius and g is the gain in the fiber. For obtaining a single mode beam the two lowest order modes ($LP_{01}$ and $LP_{11}$) are the most important to consider. For the strongly anti-index guided regime these modes have a threshold imaginary part of the V-Square parameter of $G_{th}$, which can be approximated by the following equations when $\Delta N$ is less than approximately $-50$:

$$G_{th} \approx \sqrt{\frac{133.8}{-\Delta N}} \quad \text{for } LP_{01} \quad (6)$$

$$G_{th} \approx \sqrt{\frac{862.2}{-\Delta N}} \quad \text{for } LP_{11} \quad (7)$$

For single mode gain guiding to occur, the $G_{th}$ for the $LP_{11}$ mode can not be exceeded, and this means that the g (gain) in the laser must be kept below a given value based on this $G_{th}$. If this $G_{th}$ for the $LP_{11}$ mode is exceeded the fiber will gain guide in the multimode regime. By setting equations 2 and 4 equal and substituting equation 1 for $\Delta N$ one can determine an expression for the threshold gain g for the $LP_{11}$ mode. This is given by $$g_{thLP_{11}} = \frac{\lambda^2}{a^3} \sqrt{\frac{862.2}{32 n_0^3 \pi^4 \Delta n}} \quad (8)$$

Along the same lines, the gain (g) must also be large enough to allow the $LP_{01}$ mode to exist, if this is not met the fiber will not gain guide at all. By combining equations 5 and 6 and substituting equation 4

$$g_{thLP_{01}} = \frac{\lambda^2}{a^3} \sqrt{\cdot \frac{133.8}{32 n_0^3 \pi^4 \Delta n}} \quad (9)$$

is obtained.

A final consideration for this threshold situation is the gain for laser oscillation. This is gain required in addition to the gain for gain guiding to occur, so this must be added to the $LP_{10}$ threshold to determine if the total laser gain will exceed the $LP_{11}$ threshold. The gain for a laser to oscillate is given by the expression $$g_{osc} = \frac{\ln(R_1 R_2)}{2l} + \alpha \quad (10)$$

where $R_1$ and $R_2$ are the reflectivities of the two cavity mirrors, l is the gain medium length and $\alpha$ is the cavity loss in inverse centimeters. With these three gain criteria it can be determined if gain guiding occurs in a particular fiber. Table 1 shows conditions for different gain guided fiber operating regimes as examples of the different situations that can occur.

TABLE 1

| Total laser threshold gain | Type of Guiding |
| --- | --- |
| $g_{osc} < g_{thLP01}$ | No gain guiding, threshold gain is low enough that if the laser will lase by some other guiding phenomenon it will clamp the gain at a value below the gain guiding threshold |
| $g_{thLP01} < g_{osc}$; and $g_{osc} + g_{thLP01} < g_{thLP11}$ | Single mode gain guiding can occur because the total laser gain is in a regime that allows only lowest order mode to be gain guided |
| $g_{osc} + g_{thLP01} > g_{thLP11}$ | Multimode gain guiding can occur because the threshold of at least one other higher order gain guiding mode is exceeded |

For purpose of illustration, the information is displayed in a useful way, the equations are shown in an Excel spreadsheet with simple "If" comparison statements to determine the regime that a laser with a particular core size, length, cavity loss and output coupler would be in. The spreadsheet also calculated that Fresnel number and cavity loss percent to check the information on the sheet. Situations were calculated where loss was a factor and where loss is not taken into account. Table 2 is a table of sample results predicted by the model tested in the lab in both the end pumped and flashlamp pumped regimes.

TABLE 2

| Fiber Core Diameter | Pump Type | Fiber Gain Length | Output Coupler Reflectivity | Gain Guiding Prediction with Proper Loss | Result Agrees with Prediction |
|---|---|---|---|---|---|
| 100 μm | Flashlamp | 8.5 cm | 4% | Single Mode | Yes |
| 200 μm | Flashlamp | 8.5 cm | 75% | Single Mode | Yes |
| 300 μm | Flashlamp | 8.5 cm | 90% | Single Mode | Yes |
| 400 μm | Flashlamp | 8.5 cm | 95% | Single Mode | Yes |
| 200 μm | Diode End Pump | 2 cm | 98% | Single Mode | Yes |

The cavity loss has a large effect on whether gain guiding occurs. Selecting an appropriate value for the loss is key in using the model to properly predict an output coupler for use. The cavity alignment can be changed to change the loss in the cavity and thus to induce or restrict gain guiding, making up for being off in estimates of loss. FIGS. 4a, 4b, and 4c show an example of an Excel sheet with the parameters of the first diode end pumped gain guided laser entered. This model can be further honed and tested as more gain guided fiber lasers are made and their results are compared to the theory of the model.

When placed in the chamber and exposed to the pumping several observations were made to suggest laser action was occurring in the fiber. First the output power from the fiber increased at a pump value of approximately 15 J, suggesting a threshold behavior. Second, the spectrum of the laser output narrowed significantly from approximately 10 nm below threshold to approximately 1 nm width centered at approximately 1052 nm above the threshold pump value. Relaxation oscillation spikes were observed in the output from the laser, further suggesting laser action. Using a camera placed at the laser output, the beam profile is observed above and below threshold. After the threshold the beam becomes very round and Gaussian in nature, suggesting single mode $LP_{01}$ oscillation in the cavity. When the HR mirror is removed, the above phenomena cease showing laser action indicating that the gain guided index antiguided fiber is lasing in a single mode.

Figure 5:
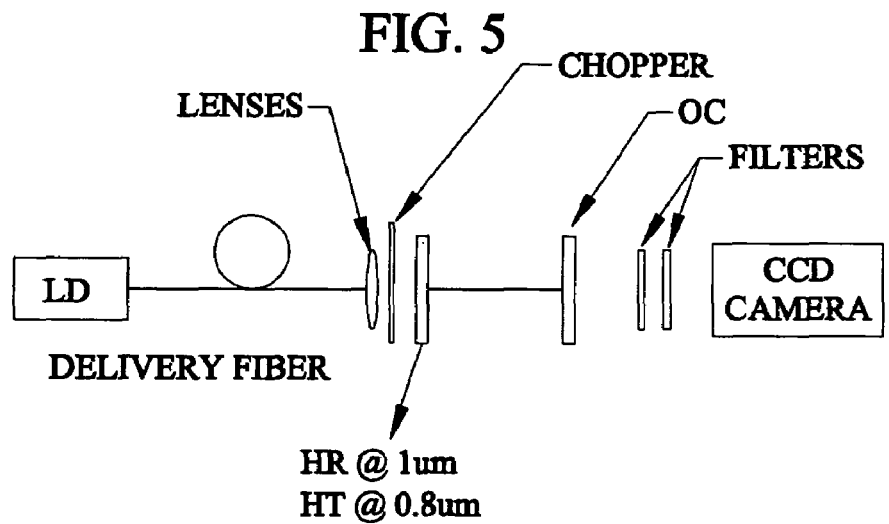
FIG. 5 is a schematic diagram of a gain guided index antiguided fiber longitudinally-pumped by a fiber-coupled laser diode.

The second example demonstrates a single mode with $M^2$ approximately equal to 1.2 laser action in 1% $Nd^{3+}$ doped phosphate glass gain guided index antiguided fiber. The core/clad diameter of the gain guided index antiguided fiber was approximately 200 μm/334 μm. FIG. 5 is a schematic diagram of an example of the novel gain guided index antiguided fiber longitudinally-pumped by a fiber-coupled laser diode emitting at approximately 803 nm. The fiber has strong index antiguiding $-\Delta N$ approximately equal to 5027. The gain guided index antiguided fiber was mounted in an approximately 0.5 mm deep V-groove filled with thermal grease in an approximately 1-cm thick aluminum plate and the plate was mounted to a water-cooled heat sink plate. The length of the fiber was approximately 2.5 cm and only about 1 cm of the fiber from the pumping side was cooled. In this example the fiber core is doped with approximately 1%$Nd^{3+}$. The cavity is made with a high reflector at pump-end of the fiber and approximately R=98% output coupler at the other end. Several color filters are used to block the leaked pump light. For this fiber to lase in single mode, the output coupler needed to be in the range of approximately 95 to approximately 99% reflecting.

Figure 6A:
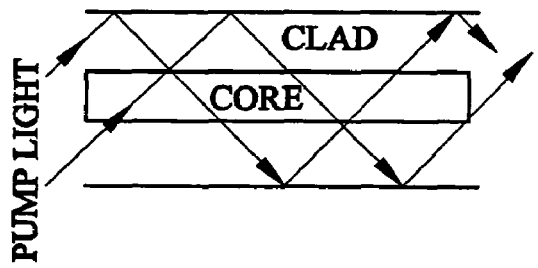
FIG. 6a shows the pump light traveling back and forth through the core of a conventional fiber to give useful laser emission.

There are limitations to the purely gain guided index antiguided fiber including the pumping scheme. Conventional fibers are pumped through their ends using dichroic mirrors or fiber Bragg gratings which allow pump light to pass into the fiber while reflecting the signal light. This allows all-fiber based systems have high power and yet be compact in size. End pumping relies on the so called double clad fiber in which there is a rare earth ion doped core and a glass cladding outside the core. Conventional fiber cladding has a lower refractive index than the core but a higher index than that of polymer coating or outside air. As a result of the index profile, the glass cladding or "pump cladding" contains the pump light and as the light propagates it passes in and out of the core, thus being absorbed and producing gain in the core of the fiber as shown in FIG. 6a. The signal emission light generated in the core is then confined in the core by total internal reflection at the core cladding interface resulting in an end pumping scheme that is highly efficient and simple to implement.

Figure 6B:
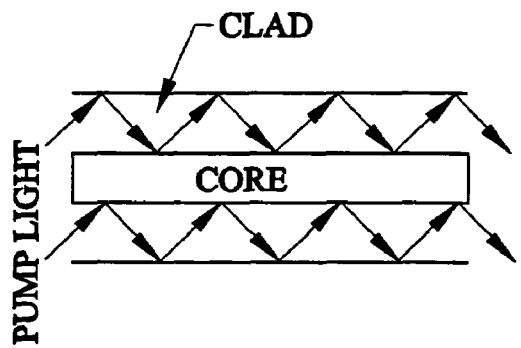
FIGS. 6b shows pump light trapped between the core and the clad in an index anti grading fiber.

The problem with the end pumped gain guided index antiguided fiber is that conventional end pumping can not be used efficiently because any light introduced into the cladding can not easily penetrate into the core because of total internal reflection at the clad-core boundary. FIG. 6b shows pump light trapped between the core and clad in an index anti grading fiber. Conversely, as shown in FIG. 6a, the pump light travels back and forth through the core of a conventional fiber wherein $n_{core}$ is greater than approximately $n_{clad}$ to give useful laser emission. As shown in FIG. 6b, pump light trapped between core and clad never gets a chance to pass through the core. Unabsorbed pump light between core and clad is a loss which lowers the efficiency of gain guided index antiguided fiber laser. In the gain guided index antiguided fibers the refractive index of core is lower than the refractive index of the cladding, just the opposite of a conventional fiber.

Figure 7:
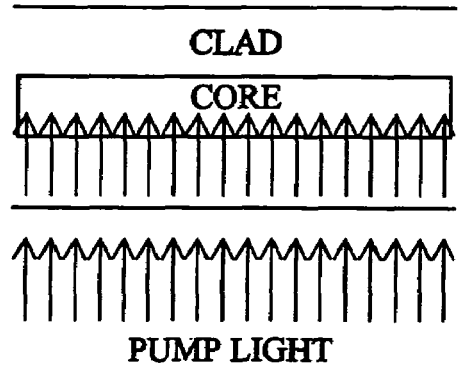
FIG. 7 is a side view of side-pumping a fiber.

One way of avoiding this limitation is to excite the core of the fiber with pump light from the side either using a diode bar or flash-lamp along the length of the fiber as shown in FIG. 7 which is a side view of side-pumping a fiber. The side-pump configuration also has the problem of sonic pump light getting trapped between the core and the cladding for the reasons explained above in regard to the index antiguided fiber. There is also a Fresnel reflection loss from the surface of the fiber, unless the entire fiber is AR coated at pump wavelength. The problem is that anti reflection coating the surface of a fiber is expensive and tedious.

Another difficulty with side pumping a fiber is that much of the launched pump light is leaked through the fiber because of the small core diameter, and unless special arrangement is made to reflect back the leaked power, the efficiency of the gain guided index antiguided fiber laser is poor. For example, a gain guided index antiguided fiber with core diameter of approximately 500 μm and an absorption coefficient of approximately 35 $cm^{-1}$, corresponding to approximately 10 wt % of $Nd^{3+}$ dopant, absorbs approximately 83% of the launched pump in a single pass. This absorbed power reduces to approximately 26% of the incident power using an approximately 100 μm core diameter fiber. Also, heavy doping (10-20 wt %) results in other problems such as heating the fiber to very high temperatures which reduces laser efficiency and destruction of the fiber.

Refractive Index Crossover in Gain Guided Index Antiguided Fibers:

The methods, systems and devices of the present invention provide gain guided index antiguiding fiber laser designed to act like a conventional fiber (index guiding) for pump wavelength, and like a gain guided index antiguiding fiber (index antiguiding) for signal wavelengths. The novel methods, systems and devices use a concept of refractive index crossover to enable a longitudinally pumped gain guided index antiguiding fiber to be pumped in the same waveguide pumping system used with conventional fiber lasers. First, the refractive indices of the core and cladding of a gain guided index antiguiding fiber are selected such that whereas the laser light is captured by the gain guided process in the core, the pump light, propagating in the cladding is effectively coupled to the core, as with conventional fiber lasers.

Figure 8:
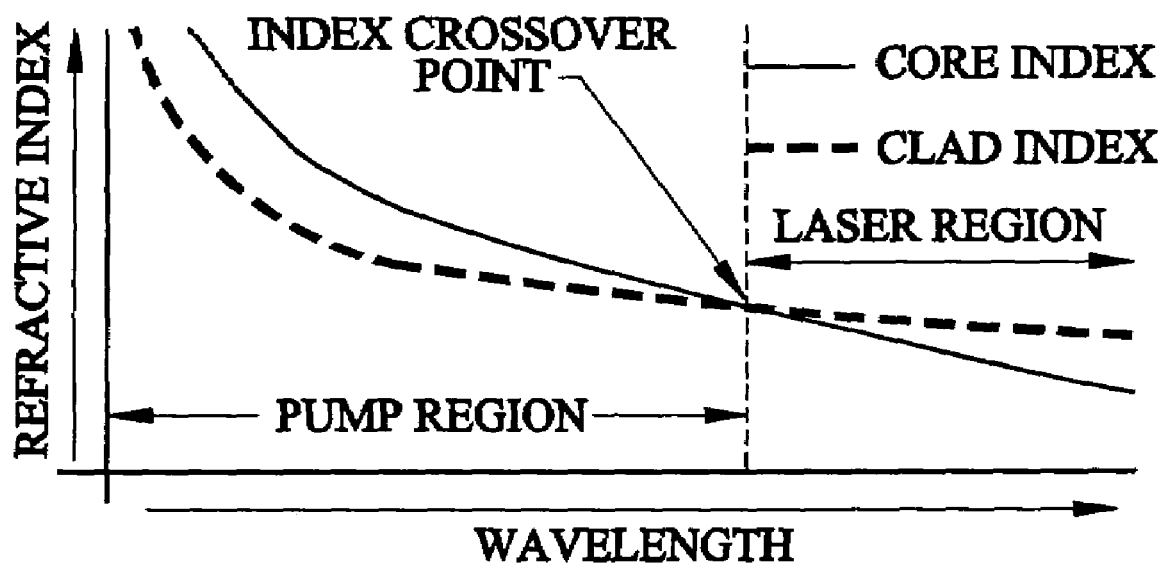
FIG. 8 is a graph showing the refractive index crossover wherein the clad and the core cross over beyond a certain wavelength.

A material that satisfies this refractive index crossover condition is in principle any transparent material, glass, ceramic, polymer or crystalline. The principle requirements for the transparent material is that its optical dispersion, the variation of refractive index with wavelength, be selected for (1) the wavelength of optical pumping radiation, which is shorter than the laser emission wavelength, the refractive index of the cladding material is less than the core material, whereas (2) the refractive index of the core material at the laser emission wavelength is less than the refractive index of the cladding at the same wavelength. These conditions then allow the pump light to propagate through the cladding as a conventional (wave guided) fiber laser, while the laser emission is captured within the core as an index antiguided, gain guided wave. Then the dispersion curve for the cladding and core corresponds to the form shown in FIG. 8, where the two dispersion curves cross one another at a wavelength between the pump wavelength and laser emission wavelengths.

While the index crossover concept is applicable to any rare earth ion doped material, the index dispersion works best in doped materials where pump and laser wavelengths are far apart e.g., Thulium (pump wavelength 790 nm and laser wavelength 2000 nm), and Ytterbium-Erbium (975 nm and 1500 nm) based laser materials. In conventional fibers the effective pump light absorption coefficient in the case of cladding pumping is low, up to two orders of magnitude lower compared to core pumping and in a gain guided index antiguided fiber the pump light trapped between core and cladding by index guiding is wasted. When the fiber is corepumped, the region of the core where the pump light enters absorbs strongly and the pump end of index antiguided fiber may be destroyed or melted due to the resulting high thermal load. By selecting a material using the novel refractive index crossover concept, the gain guided-index antiguided fiber functions like a conventional index-guiding fiber at the pump wavelength and functions like index antiguiding fiber at the lasing wavelength.

It is also necessary to determine the combination or combinations of materials that can be pulled into fibers and display the desired dispersion crossover properties and that change in refractive index with respect to temperature, dn/dT, does not alter the dispersive properties so as to negate the crossover properties at pump and signal wavelengths.

Figure 9A:
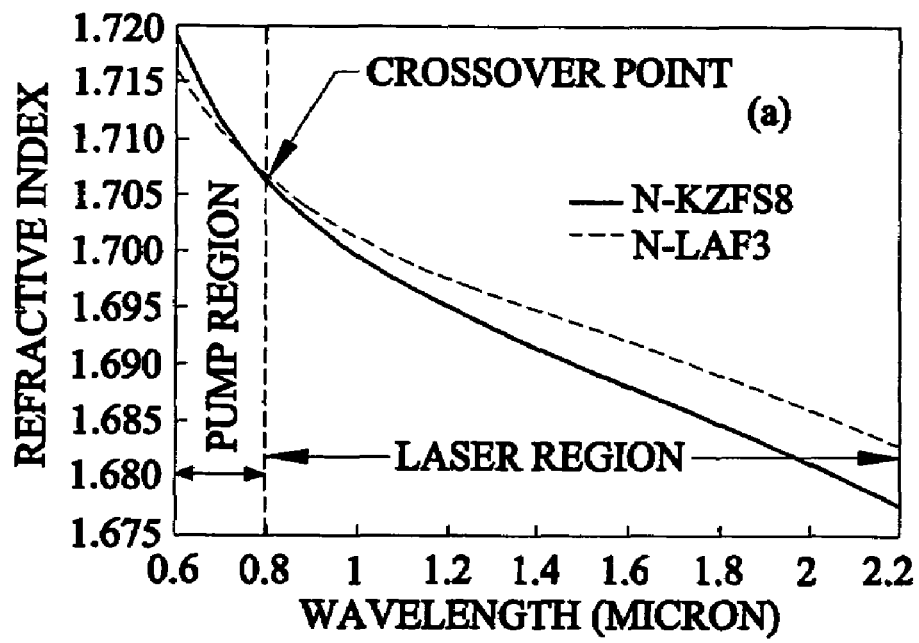
FIG. 9a is a graph showing an example of refractive index crossover for a set of glass.
Figure 9B:
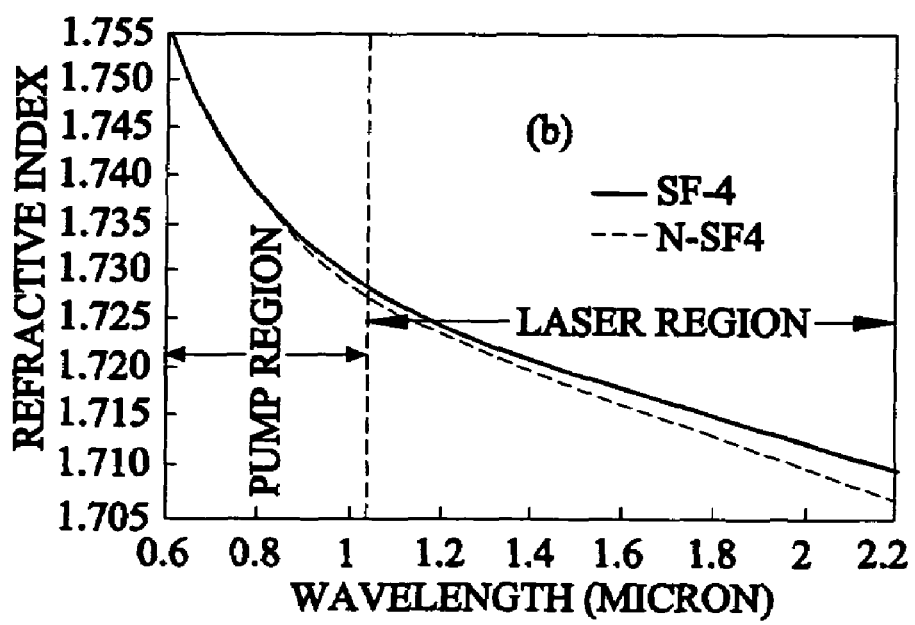
FIG. 9b is a graph showing another example of refractive index crossover for a different set of glass.

For purpose of illustration, and not limitation, FIGS. 9a and 9b show examples of refractive index crossover of two pairs of Schott's optical glasses. FIG. 9a shows the refractive index crossing for Schott N-KZFS8 and N-LAF3 optical glasses and FIG. 9b shows the refractive index crossing for Schott SF4 and N-SF4 optical glasses. As shown in FIG. 9a, at wavelengths lower than approximately 0.8 μm the refractive index of N-KZFS8 is larger than that of N-LAF3 at same wavelengths, whereas at the wavelengths larger than approximately 0.8 μm the refractive index of N-KZFS8 is lower than that of N-LAF3 at same wavelengths. As shown in FIG. 9a, a fiber having a core made of N-KZFS8 and a cladding made of N-LAF3 can be pumped at any wavelength in the 'pump region' to have conventional index guiding of the pump light and any wavelength in the 'laser region' is index antiguided. In addition, in the case of SF4 and N-SF4 glasses there is no refractive index step for wavelengths in the 'pump region' as shown in FIG. 8b which results in smaller thermal load at the pump-end of the fiber due to the fact that a large portion of the pump light is not confined in the core. Pump light confined in the core is absorbed at a shorter distance compared to light not confined in the core, thus spreading the heat over a longer length of the fiber.

While the glass combinations used in FIGS. 9a and 9b illustrate the optical properties central to the present invention, it will be obvious to one skilled in the art to substitute alternative materials that are more robust such as pairs found in Schott glass catalogue which show crossover property. For example, N-LAF35 combined with LAFN7 and N-KZFS4 combined with N-SK2. Likewise, it will be obvious to one skilled in the art that other glass manufacturers would have glasses available with similar crossover characteristics.

Figure 10:
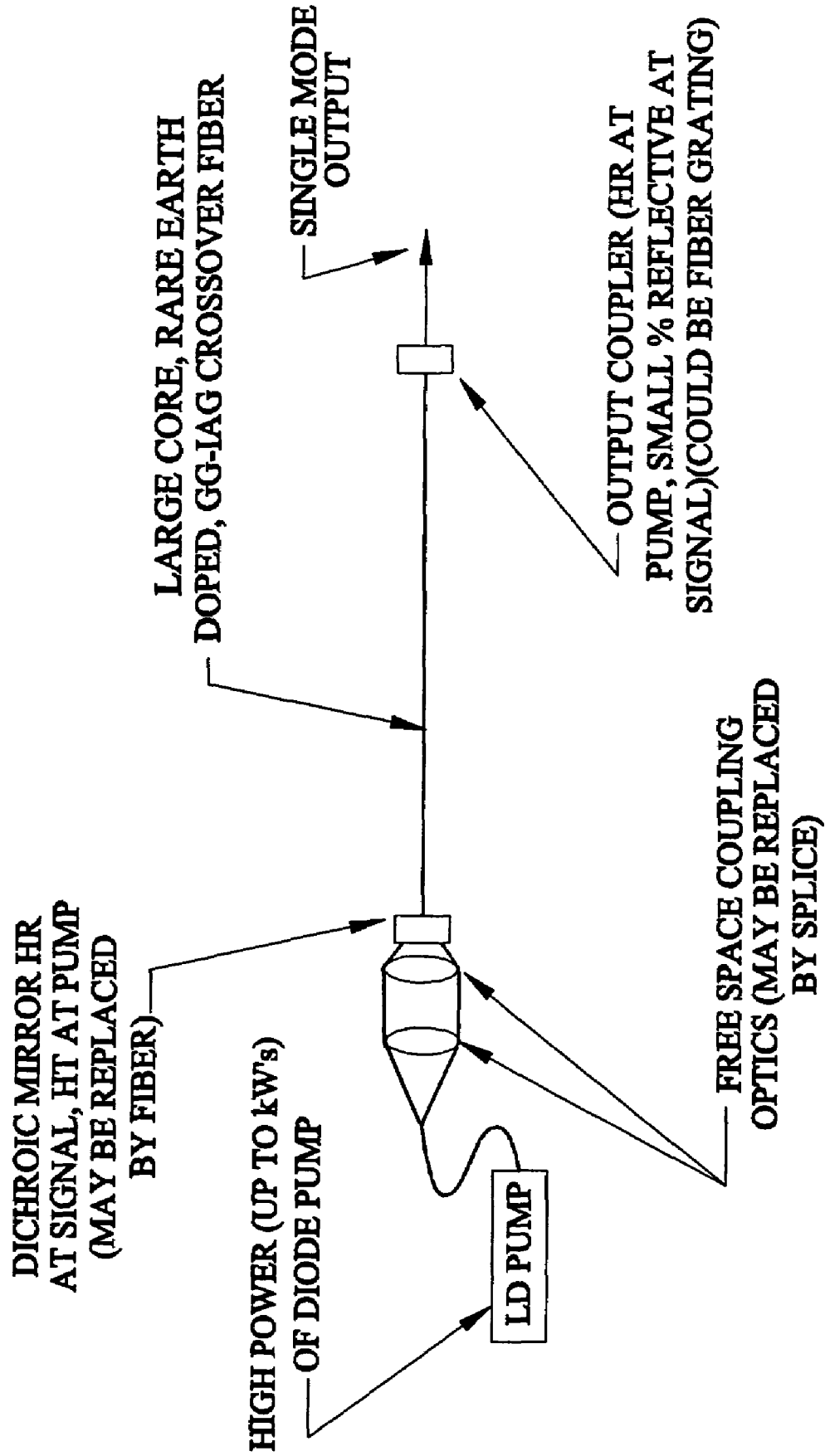
FIG. 10 is a schematic diagram of a refractive index crossover gain guided-index antiguided fiber laser.

Examples of LD-pumped Refractive Index Crossover (RIC) gain guided-index antiguided fiber lasers include refractive index crossover gain guided-index antiguided fiber lasers using end pumping and end-pumped from one end of the fiber. End-pumping of refractive index crossover gain guided-index antiguided fiber can be achieved at either end pumped from one end of the fiber, pumped from both ends of the fiber, pumping along the length of the fiber using tapered fiber bundles, and a combination of pumping techniques. FIG. 10 is a schematic diagram showing an example endpumped from one end of the fiber for a refractive index crossover gain guided-index antiguided fiber laser.

Selecting a refractive index crossover gain guided-index antiguided fiber having a core diameter within a range of approximately 100 to approximately 500 μm as the gain medium provides the desired gain and spreads the pump light over a long enough length to reduce thermal effects. In an embodiment, pump light is provided through the end using standard free space or fiber based coupling methods. The other end of the fiber has an output coupler spliced or butt coupled to it, or simply Fresnel reflection, to make the output end of the cavity.

In the example of end-pumping from both ends of the fiber, a dichroic mirror at one end of the fiber at an angle between approximately 10 to approximately 45 degree is used. Using the dichroic mirror pump light can be coupled into the fiber and signal light can be taken out of the cavity.

Figure 11:
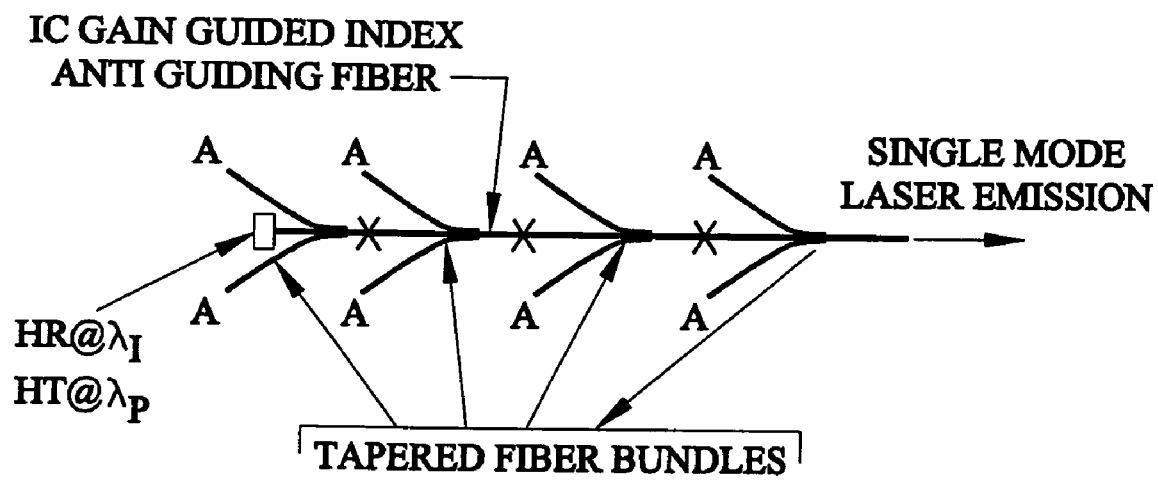
FIG. 11 is a schematic of refractive index crossover gain guided-index antiguided fiber laser using tapered fiber bundles.

FIG. 11 is a schematic of refractive index crossover gain guided-index antiguided fiber laser using tapered fiber bundles to get uniform pump distribution along the length of the fiber and hence uniform thermal distribution. FIG. 11 shows an example of longitudinal pumping of a refractive index crossover gain guided index antiguided fiber using commercially available tapered fiber bundles. Each 'A' represents one of the various legs of the tapered fiber bundles where pump light is coupled either using free space optics or fiber coupled to a laser diode can be spliced directly to these legs. Using tapered fiber bundles the pump power is distributed across the length of the gain fiber, resulting in uniform pumping and hence uniform thermal distribution.

In a second embodiment the refractive index crossover gain guided index anti guiding fiber laser uses a side-pumping pump light having Fresnel reflection loss at the fiber surface. While the fibers may be anti reflection coated at pump wavelength, anti reflection coating the surface of a fiber is expensive and tedious. In addition, as previously presented, unless special arrangements are made to reflect the leaked pump light back into the fiber, the efficiency of the laser is poor due to low absorption in the core.

Figure 12:
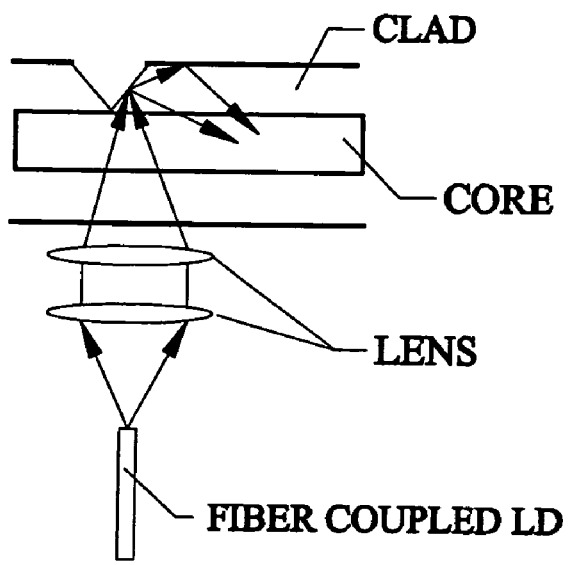
FIG. 12 is a schematic of the v-groove side pumping of a fiber.

In another embodiment, the refractive index crossover gain guided index anti guiding fiber laser is side pumped using v-groove side pumping. FIG. 12 is the schematic of a v-groove side pumping technique. In this embodiment V-grooves are made directly on fiber side walls as shown in the figure. Pump light is injected through the clad, and coupled into the first cladding after undergoing a total internal reflection at the glass-air interface of the v-groove facet. The reflected light cone is guided if its angular spectrum is within the first cladding acceptance angle.

Figure 13:
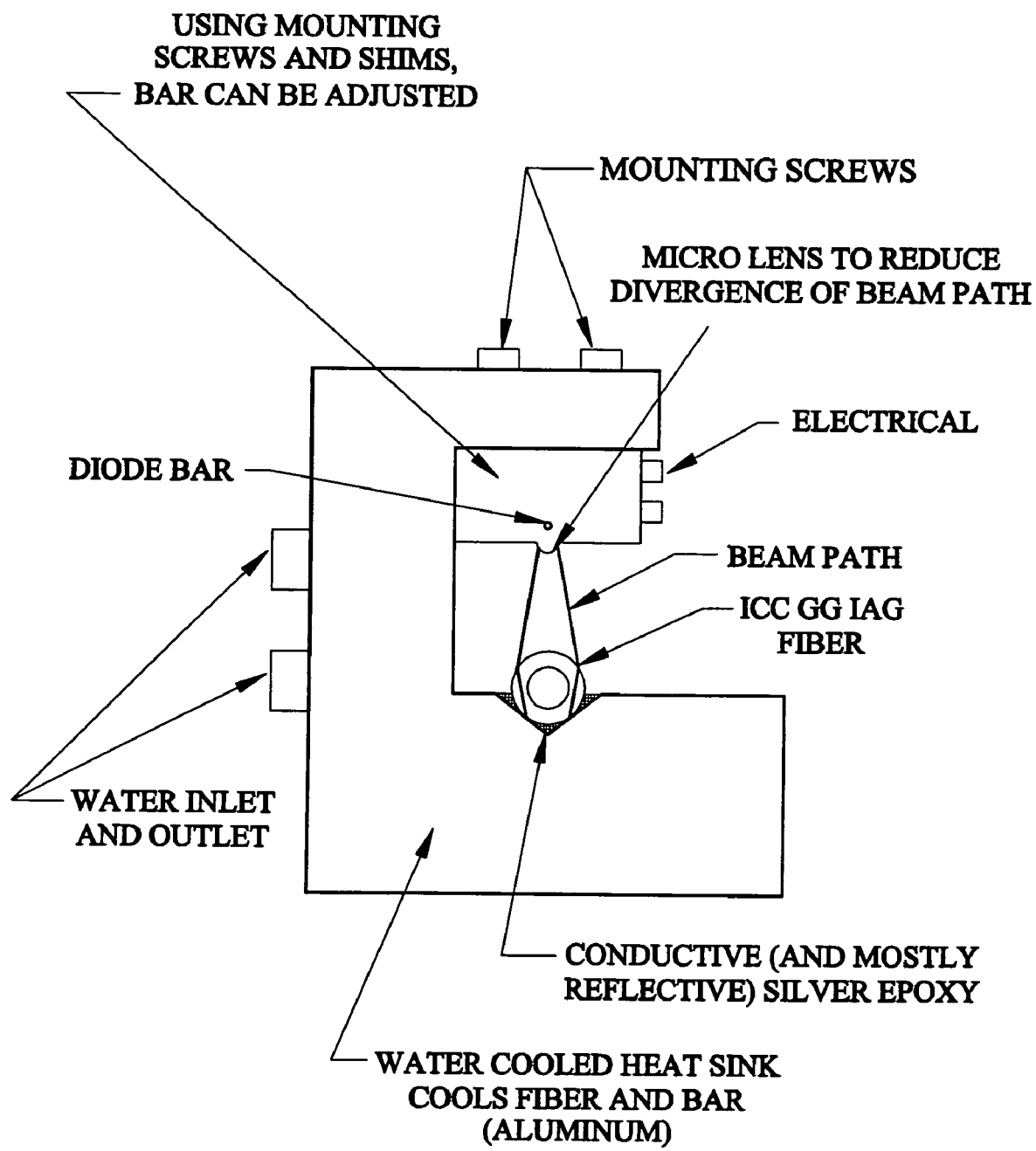
FIG. 13 is a side view of an index crossover gain guided index antiguided fiber laser module.

In yet another embodiment, the side pumping is accomplished using a laser diode array. This relatively simple and readily available method uses collimated diode bars to pump a few centimeter length of heavily doped refractive index crossover gain guided index antiguided fiber. In an example the "gain guided module" consists of a mechanical structure to hold and align the bar and fiber which also provides cooling to both the fiber and diode. FIG. 13 is a schematic of an example of an index crossover gain guided index anti guiding fiber laser module using a diode bar.

As shown in FIG. 13, the module contains a section of refractive index crossover gain guided index antiguided fiber that is easily spliced or simply butt coupled on high reflector mirror or even a fiber Bragg grating. A second mirror or fiber grating can be added to the other end of the module to create the resonant cavity in the laser if the Fresnel reflection is not sufficient. The length dimension of the module is scaled in a range of approximately one centimeter to several centimeters depending on the length of the diode bar package. Several 1 cm standard diode bar packages could be lined up to make one long gain guided module. These modules could be made into free standing moderate power lasers which would result in short, gain guided fiber lasers if designed to have a sufficient length with enough pump power mirrors to attain continuous wave lasing. Cooling water can be used to cool both the bar and gain guided fiber from a single chiller. Alternatively, water cooling is completely avoided when a suitably efficient fan/air cooled heat sink is used. A moderate power index crossover gain guided index antiguided fiber laser can be made using approximately 5 to 7 watt single emitters, in which case the diode bar in the schematic is replaced with a single emitter and line generating lens system. The single emitter significantly reduces the size of the overall module.

Yet another embodiment, the index crossover gain guided index-antiguided fiber laser uses evanescent coupling for side pumping for evanescent coupling of pump light into the core of the fiber. Due to the effects of evanescent coupling between contacting waveguides, pump light is then coupled into the core. This embodiment works similarly in the refractive index crossover gain guided index antiguided fiber because the refractive index crossover gain guided index antiguided fiber is a conventional fiber for pump wavelengths. The benefit of using evanescent coupling is that they are compact and require little alignment, especially compared to the bulk gain guided module previously described and shown in FIG. 13. An efficient clad to core evanescent coupling leads to an all-fiber based compact system.

Because the refractive index crossover gain guided index antiguided fiber can be used in almost any conceivable fiber laser configuration it is clear that it can be used with a huge range of rare earth ion dopants. Any rare earth ion could be used to dope a gain guided fiber laser system and hence provide emission in a range from approximately 1 micron (Nd, Yb) to approximately 4.5 microns (Tb) in wavelength from ions like Sm, Pr, Ho, Tm, Er, Yb, Nd, and Tb. Most rare earth ions have already been made into fiber lasers, so they can clearly be made into an index crossover gain guided index antiguided fiber laser. These rare earth ions can also be easily doped into any refractive index crossover ceramic, polymer, and crystalline materials.

While the invention has been described, disclosed, illustrated and shown in various terms of certain embodiments or modifications which it has presumed in practice, the scope of the invention is not intended to be, nor should it be deemed to be, limited thereby and such other modifications or embodiments as maybe suggested by the teachings herein are particularly reserved especially as they fall within the breadth and scope of the claims here appended.

We claim:

1. A gain guided index antiguided fiber laser comprising:
one single gain guided index antiguiding fiber having a refractive index crossover at a wavelength between a pump wavelength and a laser emission wavelength, the fiber having a core and a cladding, the refractive index crossover condition requiring core and cladding material be selected for a refractive index of the cladding material less than the core material at the wavelength of optical pumping radiation and the refractive index of the core material being less than the refractive index of the cladding material at the laser emission wavelength; and
a pumping system to produce a pump light having a pump wavelength, the pump light pumped into the refractive index crossover gain guided-index antiguided fiber, wherein the refractive indices of the core material and cladding material of the one single gain guided index antiguiding fiber are selected so that the laser light at the laser emission wavelength is guided by the gain guiding process in the core and the pump light at the pump wavelength that is different than the laser emission wavelength propagating in the fiber is effectively coupled into the core via an index guiding process.

2. The fiber laser of claim 1, wherein the gain guided index antiguiding fiber comprises:
a rare earth ion doped material having an index dispersion property of the refractive index crossover for the pump wavelength and laser wavelength that are significantly different such that pump light is index guided and laser light is index antiguided in the core, wherein the rare earth ion doped material includes a combination of materials that can be pulled into fibers and display the refractive index crossover and that does not alter the index dispersive properties to negate the crossover properties at pump wavelength and signal wavelengths with a change in refractive index with respect to temperature.

3. The fiber laser of claim 2, wherein the rare earth ion doped material is selected from a group consisting of:
Thulium based laser material having a pump wavelength approximately 790 nm and approximately 2000 nm laser wavelength, and Ytterbium-Erbium based laser material having a pump wavelength approximately 975 nm and approximately 1500 nm laser wavelength.

4. The fiber laser of claim 2, wherein the rare earth ion doped material is selected from a group consisting of:
Samarium, Praseodymium, Holmium, Thulium, Erbium, Ytterbium, Neodymium, and Terbium.

5. The fiber laser of claim 1, wherein the pump light is end-pumped into one end of the refractive index crossover gain guided-index antiguided fiber using fiber based coupling, the fiber laser further comprising:
an output coupler spliced with an opposite end of the fiber.

6. The fiber laser of claim 1, wherein the pump light is end-pumped into one end of the refractive index crossover gain guided-index antiguided fiber using fiber based coupling, the fiber laser further comprising:
an output coupler butt coupled with an opposite end of the fiber.

7. The fiber laser of claim 1, wherein the waveguide pumping system comprises:
a tapered fiber bundle for uniform pump light distribution along a length of the fiber for uniform thermal distribution.

8. The fiber laser of claim 1, wherein the waveguide pumping system comprises:
v-groove side pumping system, the fiber v-grooves directly on a fiber side wall as where pump light is injected through the cladding and coupled into a first cladding after undergoing a total internal reflection at a glass-air interface of the v-groove facet.

9. The fiber laser of claim 1 wherein the pumping system comprises:
a mechanical structure to hold and align a laser diode array and the fiber for side pumping the fiber; and
a cooling system coupled with the mechanical structure for cooling the laser diode array and the fiber.

10. A method for producing an optically pumped gain guided index antiguided fiber laser comprising the steps of:
selecting one single gain guided index antiguiding fiber having a refractive index crossover at a wavelength between a pump wavelength and a laser emission wavelength comprising the steps of:
selecting a fiber material having an optical dispersion consisting of:
selecting the fiber material including a cladding material and a core material, the cladding material having a cladding refractive index less than a core refractive index for a wavelength of optical pumping radiation from the waveguide pumping system; and
further selecting the fiber material for a laser emission wavelength, the core refractive index of the core material at the laser emission wavelength is less than the cladding refractive index at the same laser emission wavelength to allow the pump light to propagate through the cladding as a conventional wave guided fiber laser, while the laser emission is guided within the core as an index antiguided, gain guided wave;
providing a waveguide pumping system to produce pumping optical radiation at a pump wavelength; and
pumping the pump light into the one single gain guided index antiguiding fiber, the refractive indices of a core and a cladding of the gain guided index antiguiding fiber are selected to allow a laser light emission wavelength to be guided by a gain guiding process in the core while the pump light at the pump wavelength that is different than the laser emission wavelength, propagating in the fiber is effectively coupled into the core via an index guiding process.

11. The method of claim 10, wherein the fiber material selection step comprises the step of:
selecting a fiber material from a group consisting of a transparent glass, ceramic, polymer or crystalline, wherein the selected fiber material satisfies the refractive index crossover.

12. The method or claim 10 wherein the step of selecting a refractive index crossover gain guided-index antiguided fiber includes the step of:
selecting a fiber having a core diameter within a range of approximately 100 to approximately 500 μm as the gain medium to provide a predetermined gain and to spread the pump light over a long enough length of the fiber to reduce thermal effects.

13. The method of claim 10, wherein the pumping step comprises the step of:
end-pumping the refractive index crossover gain guided index anti-guided fiber at one end of the fiber.

14. The method of claim 10, wherein the pumping step comprises the step of:
end-pumping the refractive index crossover gain guided index anti-guided fiber from both ends of the fiber.

15. The method of claim 14, wherein the step of end-pumping from both ends of the fiber comprises the step of:
coupling a dichroic mirror at one end of the fiber at an angle within a range of approximately 10 to approximately 45 degree.

16. The method of claim 15, further comprising the step of:
adding one of a second mirror and a fiber grating to an opposite end of the fiber to create the resonant cavity in the laser when a Fresnel reflection is not sufficient.

17. The method of claim 10, wherein the pumping step comprises the step of:
longitudinally pumping the refractive index crossover gain guided index anti-guided fiber along a length of the fiber using a tapered fiber bundle.

18. The method of claim 10, wherein the pumping step comprises the step of:
pumping the refractive index crossover gain guided index anti-guided fiber using a combination of end pumping and longitudinally pumping the fiber along the length of the fiber using a tapered fiber bundle.

19. The method of claim 10, wherein the fiber selection step comprises the step of:
selecting a transparent material having an optical dispersion for the wavelength of optical pumping radiation, which is shorter than the laser emission wavelength, the refractive index of the cladding material is less than the core material and a refractive index of the core material at the laser emission wavelength is less than the refractive index of the cladding at the same wavelength.

20. The method of claim 19, wherein the selecting the transparent material further comprises the steps of:
providing a fiber; and
doping the fiber with one or more rare earth ions that can be pulled into the fiber to obtain the refractive index crossover properties, the ion doped material having pump and laser wavelengths that are different for pump light is index guided and laser light is index antiguided in the core.

21. The method of claim 20, wherein the ion doped fiber is selected from a group consisting of Thulium (pump wavelength 790 nm and laser wavelength 2000 nm) and Ytterbium-Erbium (975 nm and 1500 nm) based laser materials.

* * * * *

UNITED STATES PATENT AND TRADEMARK OFFICE
CERTIFICATE OF CORRECTION

| | | |
|---|---|---|
| PATENT NO. | : 7,668,211 B1 | Page 1 of 1 |
| APPLICATION NO. | : 11/937771 | |
| DATED | : February 23, 2010 | |
| INVENTOR(S) | : Vikas Sudesh | |

It is certified that error appears in the above-identified patent and that said Letters Patent is hereby corrected as shown below:

Title Page item 73
The second assignee is Clemson University, located in Clemson, South Carolina.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,668,211 B1 | |
| APPLICATION NO. | : 11/937771 | |
| DATED | : February 23, 2010 | |
| INVENTOR(S) | : Vikas Sudesh | |

It is certified that error appears in the above-identified patent and that said Letters Patent is hereby corrected as shown below:

Col. 1, Ln 3, insert

--STATEMENT REGARDING FEDERALLY SPONSORED RESEARCH OR DEVELOPMENT

This subject invention was made with government support under U.S. Department of the Army, federal contract number W911NF-05-1-0517. The government has certain rights in this invention.--

Signed and Sealed this
Eighth Day of March, 2011

David J. Kappos
*Director of the United States Patent and Trademark Office*